United States Patent [19]

Brown et al.

[11] Patent Number: 4,926,526
[45] Date of Patent: May 22, 1990

[54] REUSABLE BAG CLOSURE

[76] Inventors: Christine C. Brown, 30001 Golden Lantern #204, Laguna Niguel, Calif. 92667; Dennis G. Brown, P.O. Box 458, Lemon Grove, Calif. 92045

[21] Appl. No.: 817,780

[22] Filed: Jan. 13, 1986

Related U.S. Application Data

[63] Continuation of Ser. No. 531,427, Sep. 12, 1983, abandoned.

[51] Int. Cl.$^5$ .................. B65D 33/16; B65D 77/10
[52] U.S. Cl. .................. 24/30.5 R; 24/559; 206/459; 383/81; 524/910
[58] Field of Search ............ 383/22, 90, 20, 81, 383/89, 91; 24/30.5 R, 559; 206/459; 524/910; 523/135; 430/931

[56] References Cited

U.S. PATENT DOCUMENTS

| 468,257 | 2/1892 | Paige | 24/30.5 R |
|---|---|---|---|
| 3,223,695 | 12/1965 | Gallaugher | 524/910 X |
| 3,354,138 | 11/1967 | Burr | 524/910 X |
| 3,425,981 | 2/1969 | Puletti et al. | 524/910 X |
| 3,535,746 | 10/1970 | Thomas, Jr. | 24/30.5 R |
| 3,571,861 | 3/1971 | Olson | 24/30.5 P |
| 3,621,539 | 11/1971 | Ayers | 24/30.5 R |
| 3,818,553 | 6/1974 | Parmenter | 24/30.5 R |
| 4,268,583 | 5/1981 | Hendy | 524/910 X |
| 4,329,191 | 5/1982 | Barber | 206/459 X |
| 4,380,103 | 4/1983 | McGrath et al. | 24/30.5 R X |
| 4,423,164 | 12/1983 | Bar | 523/135 |

FOREIGN PATENT DOCUMENTS

| 1166558 | 3/1964 | Fed. Rep. of Germany | 24/559 |
|---|---|---|---|
| 1522441 | 4/1968 | France | 24/559 |
| 91322 | 3/1958 | Norway | 24/559 |

Primary Examiner—Bryon P. Gehman
Attorney, Agent, or Firm—Nydegger & Harshman

[57] ABSTRACT

A reusable closure is described which comprises an elongate member molded from a plastics material having memory. The member is formed with a reduced thickness live hinge line extending along its length and leg portions defined on opposite sides of the live hinge line which can be urged towards and away from each other between locked and released positions. An upstanding ear extending along the length of each leg portion has a locking portion adapted to releasably snap into locking engagement with a corresponding locking portion on the other ear in the locked position. Rounded areas join each ear to its respective leg portion. A packaging and storage system using such closures is described, and methods of making such closures by extrusion or injection molding are disclosed.

21 Claims, 1 Drawing Sheet

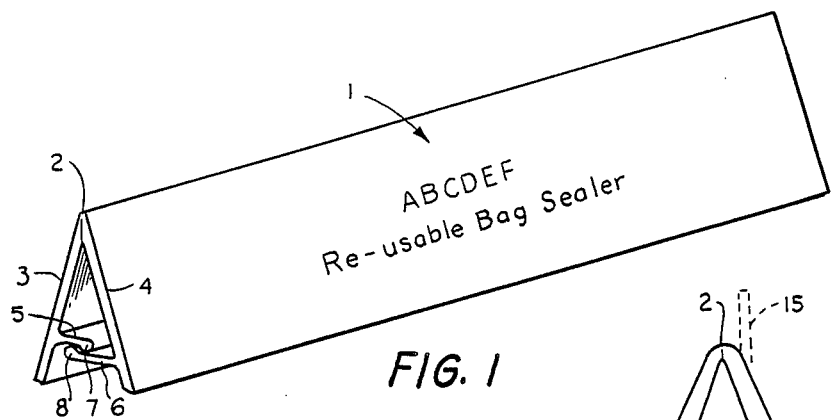
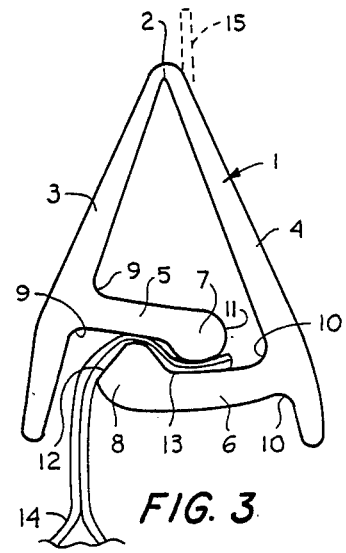
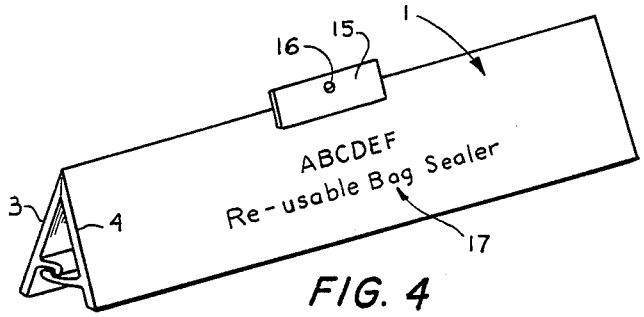
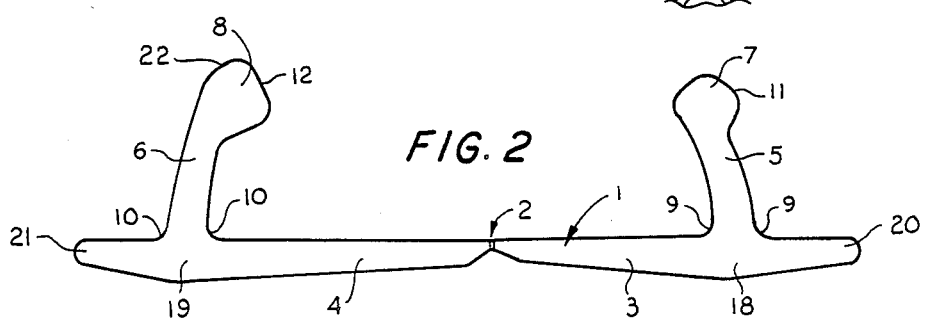
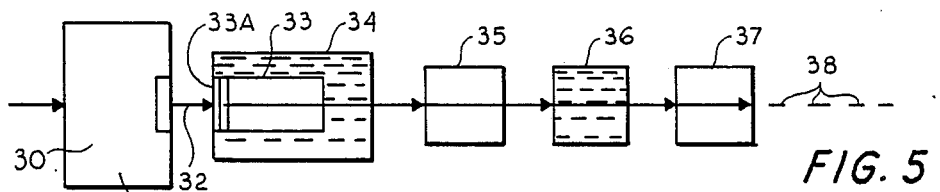
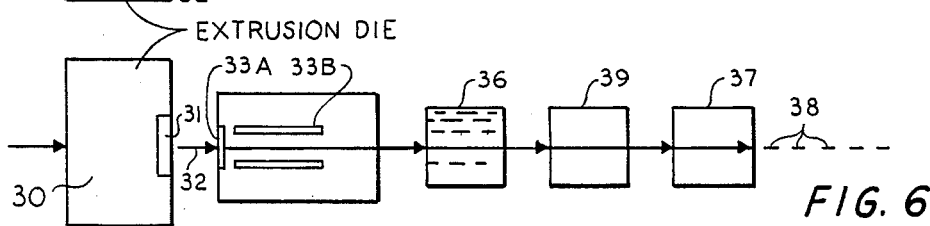

REUSABLE BAG CLOSURE

This application is a continuation, of application Ser. No. 531,427, filed Sept. 12, 1983, now abandoned.

BACKGROUND OF THE INVENTION

The present invention relates to reusable closures suitable for sealing bags or other openings, for holding sheets of pliable material together, and for other such purposes. The invention further relates to methods of manufacturing such closures, and to packaging systems using such closures.

It is a common problem in many areas to find a way of closing and resealing bags once they have been opened, particularly paper or plastic bags. For example, food is often stored in plastic bags and these bags must be resealed after opening to prevent spoilage of any unused food. Zip-lock closures are often used to seal bags of food, but these are generally not of long lasting and durable construction so they do not withstand repeated use. Other locking closures are used, but they typically are also not of durable construction.

In the electronics industry, it is common to store a plurality of one type of electronic component in a bag of plastics or other material. It is a problem in this field to find a way of resealing such component bags which gives an air-tight, moisture-free, and anti-static seal. When one component is removed, the bags are commonly resealed with tape or staples. Tape will typically peel off under hot or moist conditions, and, when removed to re-open the bag, will often tear the bag material. Staples are no longer permitted as bag closures in many areas, and do not seal the bags properly so the components may deteriorate due to exposure to the atmosphere. In this area, the known anti-static zip lock bags do not have a long enough life over repeated locking action. Moreover, shrouding and covering of large items and equipment with a pliable material, such as shrouding of missiles and aerospace engines and the like, for storage and transport, can be a problem when attempting to tape or otherwise seal the covering material edges together.

In fields where a large number of different electronics or other parts have to be kept in storage so that they are readily accessible when needed, such as the military, aviation, aerospace, electronic, and construction industries, there are also problems in labelling bags. At present, peel-off labels are used to identify the products. These labels often peel off under hot or moist conditions, causing problems in identifying parts. Relabelling a bag is also difficult, since pulling off a label will often tear the bag material.

SUMMARY OF THE INVENTION

It is a primary object of this invention to provide a heavy duty closure which can be repeatedly and easily used with reduced risk of failure of its locking action.

It is a secondary object of this invention to provide a method of manufacturing such a closure.

A further secondary object of this invention is to provide reusable closures which can be easily used in a packaging and storage system when a plurality of different types of merchandise must be stored in a series of sealed bags, and identified easily such as by color coding.

A further object is to provide closures which can be used to seal large pieces of covering materials together, such as plastic sheets, to protect large objects from moisture and dirt.

According to one aspect of this invention, an elongate closure is provided of the type comprising a member molded from plastics material such that a reduced thickness continuous live hinge line is formed along its length, with leg portions defined on opposite sides of the live hinge line which are movable towards and away from each other about the live hinge line. Each leg portion has an upstanding ear extending along its length, and the areas joining the leg portions and ears are rounded. The ears have interengageable locking portions at their free edges which are adapted to releasably snap into locking engagement when the legs are urged together into an A-shaped locking position. One of the locking portions has a slanted flat face and the other locking portion has a rounded face positioned so as to initially engage the slanted flat face when the leg portions are urged towards each other and to slide over the flat face into the locking position.

When the closure is used to seal a bag, for example, the open end of the bag is placed between the ears and the leg portions are urged towards each other. The locking portions snap into locking engagement with the bag opening clamped between them. The leg portions are urged apart to release the bag.

The plastics material is one that has "memory". In other words, the material is such that the ears and locking portions repeatedly return to their initial shape and orientation after locking and releasing actions. The material must therefore not be too flexible, but on the other hand must not be too hard so that there is an increased risk of the locking portions or ears snapping or tearing. One suitable plastics material for this purpose is a copolymer of more than 85 percent polypropylene and the rest polyethylene. Another suitable material is a mixture of more than 85 percent copolymer and the rest rubber. In a preferred embodiment the copolymer used contains 1 to 2 percent polyethylene and 99 to 98 percent polypropylene. The copolymer is preferably mixed with an anti-static material so that the closure is anti-static.

The closure can be designed with suitable dimensions for sealing bags of any size, thickness, or material, or for larger scale uses in sealing cover sheets protecting objects from the environment, such as construction areas, aeroplanes, missiles, or vehicles of any type. In this case a suitable length of reusable closure can be used to seal overlapping edges of cover sheets together. It may also be used as a holder for sheets of any pliable material such as mylar or poly-plastics sheets. One such use would be to provide a shroud to protect a rocket or jet engine during the manufacturing process to form an environmentally controlled shelter. Furthermore, the closure permits convenient covering of test equipment, air systems, and other equipment in a clean room environment.

Preferably, the ears are arranged to curve arcuately towards each other in the released position of the closure. This reduces the stresses on the ears during repeated locking and releasing actions, and produces a closure with a longer effective lifetime, typically several thousand repeated lockings and releases.

The closure may be provided with suitable hanger means for hanging the closure and a sealed bag on a suitable support (e.g., a hook, wire or bar). In this way a plurality of bags sealed with the closures can be hung in easily accessible and visible positions. This is useful whenever storage space is limited, such as in camping or travelling. It is also useful in industrial or commercial store rooms, when large quantities of merchandise must be stored in an easily accessible fashion. Thus, such closures may be provided as a storage system in a plurality of different colors. In addition, such closures could be used in a continuous track or conveyor type inventory control system, such as the conveyor type systems typically encountered at clothes cleaning establishments. Different color closures may be used to color code different electronic components, and then hung in easily visible positions so that items can be retrieved when necessary. The closures can be labelled and relabelled for inventory control by writing on the outer faces of the leg portions.

The closure of this invention can be made in one piece by extrusion or injection molding.

According to one aspect of the invention, a method of making such a closure is provided, which comprises the steps of:

mixing a copolymer of polypropylene and polyethylene with an anti-static material.

heating and melting the mixture;

extruding the melted mixture through a die to form the closure shape of a substantially flat elongate part with a reduced thickness line extending along its length to form a live hinge line and upstanding interengageable locking portions extending along its length of closure to its setting point by passing it through after forming means and into a cooling bath;

and cutting the closure to the desired size.

Preferably, the closure is urged into its A-shaped locking position before cutting it to size. This gives a longer life to the live hinge since it is flexed before the molecular structure sets in. It is also easier to pack and ship the closures in their closed position.

The length of closure may be passed through a second cooling bath before being cut to size. The length of closure may be passed with its locking portions upwards in the first cooling bath, and then be twisted so that the locking portions face downwards in the second cooling bath.

The closure may alternatively be formed by injection molding In this procedure the copolymer is mixed with anti-static material, melted, and injected into a mold having an internal shape to form the closure. In contrast to the extrusion process, the mixture is directed to flow transversely across the live hinge, rather than along the live hinge axis. The mixture is then cooled to its setting point and the formed closure ejected from the mold.

Thus the closure of this invention may be manufactured within fairly close tolerances. It may be used in a storage system, and has a relatively long lifetime over repeated uses.

BRIEF DESCRIPTION OF THE DRAWINGS

The following is a brief description of the accompanying drawings, which show some preferred embodiments of the present invention:

FIG. 1 shows a perspective view of a reusable closure according to the invention in its closed or locking position;

FIG. 2 is an end view of the closure of FIG. 1 in its released position, on an enlarged scale;

FIG. 3 shows an end view of the closure of FIG. 2 in its closed position sealing the open end of a bag and also showing a hanger tab;

FIG. 4 shows a perspective view of a modified closure according to the invention; and FIG. 5 is a flow chart showing schematically a method of making closures according to the invention.

FIG. 6 is a flow chart showing schematically an alternative method of making closures according to the invention.

DESCRIPTION OF THE PREFERRED EMBODIMENT

FIGS. 1 to 3 show a reusable closure 1 according to a preferred embodiment of the present invention.

The closure 1 comprises a one-piece elongate member molded from a plastic material. The member is formed with a reduced thickness live hinge line 2 extending along its length on opposite sides of which leg portions 3, 4 are defined. The leg portions 3 and 4 are movable towards and away from each other about the live hinge line 2 between the A-shaped locking position shown in FIGS. 1 and 3 and the released position shown in FIG. 2.

Each leg portion 3, 4 has an upstanding ear 5, 6 extending along its length with a locking portion or lip 7, 8 at its free edge. The locking portions 7 and 8 are adapted to cooperate with each other to snap into locking engagement when the leg portions 3 and 4 are urged together into the A-shaped locking position shown in FIGS. 1 and 3. The ears 5 and 6 curve arcuately towards each other in the released position, as shown in FIG. 2. The areas 9, 10 where each ear joins its respective leg portion are rounded to reduce the risk of the ears snapping or tearing off. The rounding in these areas reduces the stresses during locking and releasing actions. Furthermore, such rounding adds to the strength, as opposed to sharp corners.

In the locking position shown in FIGS. 1 and 3 the locking portion or lip 7 of the ear 5 projects downwardly and the locking portion or lip 8 projects upwardly. The lip 7 has a rounded face 11 and the lip 8 has a slanted flat face 12.

When something is to be held or sealed by the closure 1, such as the open end 13 of a bag 14 as shown in FIG. 3, the open end 13 is first positioned between the ears 5 and 6 with the closure in a released position Depending on the desired use, the open end 13 can be folded over before being positioned to ensure an even tighter seal. The leg portions 3 and 4 are then urged towards each other into a A-shape. The rounded face 11 of the lip 7 will engage the slanted flat face 12 of the lip 8 through the bag material, and will slide over this face 12 to snap into the locking position shown in FIG. 3 The open end 13 of the bag is then clamped firmly between the ears 5 and 6. Thus the slanted flat face provides a sliding surface to aid in the locking action. To release the bag, the leg portions 3 and 4 are urged apart until the locking portions snap out of engagement. The leg portions 3 and 4 can be urged apart by gripping the ends thereof and pulling them apart.

In a modification the closure 1 may be provided with a bag already attached. In this modification, the open end of the bag is attached or bonded along one side to the inside edge of leg 3 immediately above ear 5.

The closure may be used for sealing bags of any material, for example plastics, mylar, paper, cloth, and so on. It may be provided in any desired length, and may be designed with proportions suitable for holding or sealing any thickness of pliable material. It may also be used, for example, to hold together overlapping edges of cover sheets, such as mylar or the like, used to protect construction site areas, vehicles, large items during transportation, and so on.

FIG. 4 shows a modification in which the closure is provided with a hanger tab 15 having an opening 16 for hanging the closure on a suitable support. Any size hook may be utilized in the opening 16, which allows the closure to be adapted for uses where it needs to hang. A hook-shaped hanger may alternatively be provided. The hanger tab allows bags sealed by the closure to be easily and accessibly stored. This is useful both in storage areas where a large number of different articles or components must be stored, and also in cases where storage space is limited, for example when camping, when travelling in boats, planes or cars, or in other domestic uses.

A simple storage system can be provided when such closures are supplied in a variety of different colors. Different color closures can be used for color coding different inventory components or types of merchandise, and bags sealed by the closures can be hung in easily accessible and visible positions for ready location and retrieval when needed. This is especially useful in a continuous track type inventory retrieval system.

The leg portions 3 and 4 of the closure have substantially flat portions on their outer surfaces where information 17 can be stamped, imprinted, or written by hand. Thus a closure can be written on to identify articles stored in a bag sealed by the closure, and the writing can be wiped off or erased and replaced if the closure is subsequently used to seal a bag containing different articles. In addition, one may also affix identifying labels to the flat portions.

In the closure shown in FIGS. 1 to 4, the relative proportions and orientations of the leg portions 3 and 4, ears 5 and 6 and locking lips 7 and 8 are arranged to provide a good locking action and to reduce the risk of tearing or breaking of the closure under repeated locking actions. The locking action also provides a tight enough seal to permit storing liquids without leakage at the seal. This is especially useful in many medical related uses, such as storing and freezing plasma, blood, medications, and the like. The actual dimensions used will depend on the application for which the closure is to be used, i.e. smaller scale for sealing bags of relatively thin mil material, larger scale for sealing thicker mil material bags or holding several sheets of material.

The leg portion 4 is wider than the leg portion 3 since its ear 6 must engage beneath the ear 5 in the locking position. The leg portions 3 and 4 are of varying thickness. They are of increased thickness in the areas 18, 19 adjacent the ears 5 and 6, to reduce stresses in these areas, and of reduced thickness at their outer edges 20, 21 and adjacent the live hinge line 2, where the stresses are less, in order to save material. In the embodiment shown the leg portions are of tapering thickness between the ears and the live hinge line.

The ears 5 and 6 are positioned about two thirds of the way between the live hinge line 2 and the outer edge 20, 21 of their respective leg portions 3 and 4. Thus ear 5 is closer to the live hinge line than ear 6. The relative positioning of the ears depends on the thickness of the material to be held between them. The ears curve arcuately towards each other at angles less than 90° to the leg portions. This also helps to reduce stress, particularly in large scale uses. The radius of curvature of the ear 5 is slightly less than that of the ear 6. The thickness of the ears is about the same as that of the leg portions in the areas 18 and 19.

In the released position shown in FIG. 2, the distance between each lip 7 and 8 and the adjacent leg portion 3 and 4 is about 35 percent of the width of the respective leg portion 3, 4. The ear 6 is slightly longer and slightly thicker than the ear 5.

The lips 7 and 8 are approximately twice as thick as the ears 5 and 6. The lip 7 has rounded locking face 11, and the lip 8 has rounded or arcuate faces 22 separated by the slanted flat face 12 which aids in the locking action. The faces 22 have about the same radius of curvature as the face 11. It should be noted that the legs are tapered toward the live hinge line, as shown in FIG. 2. This permits increased flexing action at the live hinge line.

When the closure is in the locking position shown in FIG. 1, an angle of about 45° is defined between the leg portions 3 and 4.

In one example of a closure of this type, the actual dimensions used were:

Width of leg portions 3 and 4 =0.812 inches, 0.930 inches;
Thickness of leg portions in areas 18 and 19 =0.075 inches;
Thickness of leg portions at edges 20 and 21 =0.042 inches;
Thickness adjacent live hinge line =0.048 inches;
Thickness of ear 5 =0.070 inches;
Thickness of ear 6 =0.075 inches;
Radius of curvature of ear 5 =0.558 inches;
Radius of curvature of ear 6 =0.635 inches;
Height of lip 7 above leg portion =0.285 inches;
Height of lip 8 above leg portion =0.338 inches;
Thickness along live hinge line =0.020 inches;
Distance between live hinge line and ear 5 =0.495 inches;
Distance between live hinge line and ear 6 =0.640 inches.

These dimensions are only given by way of example. They could be scaled up or down or changed as necessary for particular applications.

The choice of material used for the closure is fairly critical. It must be sufficiently flexible to allow the ears to flex sufficiently when they are urged into locking engagement. On the other hand, the material must have "memory", i.e. it must repeatedly return to its original shape when the ears are released. Generally, the higher the degree of memory, the more brittle the material becomes. Thus, since the ears, locking portions and live hinge line of this closure are particularly susceptible to snapping or breaking, the material used cannot be too brittle or the closure will not withstand repeated locking actions By designing the ears to curve arcuately and to have rounded, thickened areas where they join the leg portions, they are made significantly stronger. This allows a material with more memory to be used while still producing a long lasting closure.

It has been found that a desirable material for such a closure is a copolymer of between 85 and 99 percent polypropylene and between 15 and 1 percent polyethylene. The higher the proportion of polypropylene, the more memory the material will have. With the ears designed so that locking and releasing action stresses are reduced, the copolymer used may be 1 to 2 percent polyethylene and 99 to 98 percent polypropylene. This provides a closure with more memory and thus an improved and long lasting locking action.

Another embodiment utilizes rubber material which increases resiliency, and elasticity. Mixing rubber in the proportions of 15 to 5 percent rubber and the remainder as a copolymer is a suitable mixture. Preferred ranges include 15 to 5 percent rubber and 85 to 95 percent polypropylene. Another mixture would be approximately 15 to 5 percent rubber, 83 to 93 percent polypropylene, and approximately 2 percent polyethylene, respectively. Other suitable materials which exhibit improved elastic qualities, yet retain the other repeatability characteristics, include using 100 percent K-styrine.

The copolymer is preferably mixed with an anti-static material to prevent build-up of static charges when the closure is used to seal plastic bags. The anti-static material is suitably a mono or diglyceride emulsifier, such as gyceryl monostearate. The mixture may contain up to 5 percent by weight of the anti-static material.

If the closure is to be used outdoors an ultra violet inhibitor may be added to the mixture to preserve the material and protect it from sunlight. Different color closures are provided by adding suitable dye materials to the mixture. The coloring agent may be polyethylene or polypropylene, and the mixture suitable contains 1 percent by weight of coloring agent. One can premix such raw materials with the stated amounts of coloring, anti-static, or rubber.

Closures of this type can be used in many areas for sealing bags or holding sheets of material together. They can be used for packaging, storage, and/or transportation of a large variety of merchandise, large or small scale, with suitable choice of closure dimensions. This would include shrouding of many aerospace parts. They are suitable for home, industrial or commercial use, and can provide a system of packaging a large variety of different components, e.g. electrical components, for storage and easy retrieval. The closures have been carefully designed with relative proportions and suitable materials such that they can be reused many times and still retain their locking capabilities.

FIG. 5 shows a method of manufacturing lengths of the closure of FIGS. 1 to 4 by an extrusion process. The raw copolymer of polypropylene and polyethylene is mixed with anti-static material, which may be in powder or flake form D (typically Emery #6003, Atumal 84 powder Atumal 84K large flake, or Atmos #150 fine powder). The powder form has been preferred as it mixes more easily with the material. Any desired coloring agent or ultraviolet inhibitor is also mixed in at this stage, unless it is pre-mixed.

The mixture is then introduced to a machine 30, where it is heated to its melting point of about 380° F. The melted material is extruded through a tool die 31 which has a shape slightly larger to allow for shrinkage and corresponding to the desired shape of the closure in its flat configuration shown in FIG. 2. The tool die is larger because when the material is being extruded, it is pulled and stretched to the proper size as it passes into the after-forming mechanism.

The extruded length of closure 32 is then passed through a first after-forming die 33, typically in the form of a plate, with its ears uppermost. The after forming die is positioned in a first cooling bath 34. The length of closure is completely submerged in water in the cooling bath, and is passed along a further after-forming device 33 in the open water bath which ensures that the ears and locking portions maintain their correct orientations relative to the leg portions. This is done to help relieve the lengthwise bow in the material.

The length of closure is then twisted around in the next stage 35 so that the ears face downwards. This is done to further relieve any bow. It is then passed through a further cooling water bath 36 before being passed through rollers in the final stage 37 where the leg portions are urged together into the locking position. The length of closure then passes through a suitable cutting device where it is cut to the desired closure lengths 38. It is desirable to close, or snap-lock, the length of closure before cutting to size since this has been found to produce a longer lasting live hinge. The cut lengths of closure will also be ready for packaging and shipping, since they must be packaged in the locked position. Essentially, when the closure is urged into its A-shape immediately after the extrusion process, the molecular structure along the live hinge line will not yet have set in. If it is closed for at least 48 hours before the first use, a substantially stronger live hinge and better lock is provided.

The closure may be reheated before being cut to size, and it may also be heated in the stage 35 before it is passed into the second water bath 36. The cooling baths 34 and 36 are open, moving water baths. The second water bath 36 is included in the process for final cooling and has the advantage of producing closer tolerances.

The length of closure may be extruded with a projecting length of hanger tab. When the length of closure is cut to form individual closures, excess material on either side is shaved off to form a hanger tab 15 as shown in FIG. 4, and the hole or opening 16 is punched out.

A further step in the process may be provided for stamping or imprinting a name or other information on an outer face of the closure. For example, a wheel having raised figures may be used to stamp a name repeatedly onto formed lengths of closure immediately subsequent to after-forming step. When ink stamping is used, the material should be heat treated, such as by exposure to open flame, prior thereto. Also a heat stamp may be used.

Referring now to FIG. 6, there is shown an alternative embodiment wherein the steps are similar, in that they include a machine 30, a tool die 31, and closure 32 extruded to the desired shape. Extended length of closure 32 passes into a first after-forming die plate 33A. This die is the exact size of the final extruded closure. However, the closure 32 next passes into a cold die 33B preferably one to two feet long, in lieu of the afterforming device 33 and the open water bath 35 of FIG. 5. The cold die 33B is the exact size and form needed, as is the after-forming die 33A. In the cold die, the closure stays the same shape as it cools for the length of the cold die. The die preferably has holes located in it to permit a vacuum for retaining the closure, and channels for circulating cooling water or air within the die. Alternatively, the entire cold die is submerged in water. This cold die step forms a crust or skin on the closure so the closure accurately retains its shape. By using such a long cold die, no other after-forming, or twisting, of the closure is required. The bow is removed, and the shape is maintained accurate and flat due in part to the crust and improving even cooling characteristics during its travel through the cold die. Since no twisting is required, the next stage is the open water bath 36 for cooling, stage 37 for urging the closure together, and then cutting the desired lengths 38. Stage 39A may be included, as shown in FIG. 6, for imprinting or stamping identifying information on the closure.

The closure may alternatively be formed by injection molding, when the molten mixture described above is injected into a mold instead of being extruded through a die. The mold is preferably a slide mold if there is a tab or need not be if there is no tab,, since the shape of the lips on the ears would make removal of the upper half of a normal mold impractical. The mixture is directed to flow transversely across the live hinge, rather than along the live hinge axis. This results in a stronger hinge than by extension. This mixture is then cooled to its setting point and the formed closure is ejected from the mold. Closing the closure afterwards give longer life to the live hinge. A higher proportion of anti-static material may be used when the closure is formed by injection molding. In the extrusion process too much of this material creates a surge problem. A hanger tab as shown in FIG. 4 may be formed integrally with the closure in an injection molding process.

In one trial run of the extrusion process a copolymer of high impact polypropylene #PP1454A (typically 95-99 percent polypropylene and 1-5 percent polyethylene) was used. This material is made by El Paso Gas and has a melt flow of 4.0 mils and a Rockwell hardness of R55 Virgin material (no re-grind) was used.

The range of useful melt flows for the above-described processes is from 2 to 6 mils, with a higher melt flow being necessary for the injection molding process where the melted material must be injected at a much faster rate. Injection molding gives tolerances in the closure dimensions up to thousandths of an inch.

In the injection molding process a name plate may be provided in the mold itself, so that the closures are formed with a name stamped on the outer face of one or both legs. The name plate is preferably replaceable so that other names or words can be formed on the closures when desired.

The closure formed as described above by extrusion or injection molding will maintain its antistatic properties throughout its lifetime, unlike closures which simply are dipped in anti-static material or have a spray-on anti-static coating. The anti-static material becomes part of the molecular structure and is found to migrate to the surface of the closure during use. The anti-static material always replenishes itself when the surface area becomes depleted, so a long lasting antistatic effect is achieved.

The methods described above overcome many of the problems inherent in making closures of the type described. The snap lock closures must be formed within close tolerances if an effective lock is to be achieved, and the choice of materials is critical to provide the right degree of memory while not making the closure either too brittle or too soft to withstand long-term use.

Thus, according to the invention, a long lasting and repeatedly usable snap lock closure is provided, which can be designed to have anti-static properties which are maintained over the whole lifetime of the closure. A process for making such a closure within close tolerances is also provided. Additionally, another aspect of the invention provides a method of packaging a variety of merchandise, such as foodstuffs, electronic components, aerospace products, entire homes, machinery, medical supplies, or any articles to be stored either domestically or industrially. This closure is also easily adapted for use in environmentally controlled areas, as in space travel, where it is necessary to provide protection against cosmic dust such as during repair of orbiting satellites in which plastic material sheets, e.g. Mylar, can be sealed around a capsule, or used to form a closed shelter with the sheets to provide a sealed work area. In the packaging method different color closures are provided for color coding different types of merchandise. The closures may be attached to bags for storing merchandise, and hanger tabs are provided on the closures for hanging up the sealed merchandise in an easily visible and accessible position. Also, the closures can be of assistance in the medical field for freezing sterilized medical instruments and medications in moisture and air-tight containers.

It will be clear that modifications can be made to the disclosed embodiments without departing from the scope of the invention. The invention is therefore not limited to the disclosed embodiments but is defined by the appended claims.

What is claimed is:

1. A reusable closure of the type used for holding sheets of pliable material together, comprising a one-piece elongate member molded from a plastics material, the member being formed with a reduced thickness live hinge line extending along its length, substantially straight leg portions being defined on opposite sides of said live hinge line which are movable towards and away from each other about said live hinge line, said leg portions each having an upstanding ear extending along their lengths, the areas joining said leg portions and ears being rounded, said ears having interengageable locking portions at their free edges which are adapted to snap releasably into locking engagement when said leg portions are urged towards each other;

said locking portions comprising lips, one of said lips being of arcuate cross section and having a slanted flat face and the other lip being of substantially circular cross section and having a rounded face positioned so as to initially engage said flat face through sheets of pliable material disposed therebetween when said leg portions are urged towards each other and to slide over said slanted flat face into said locking position, whereby the sheets of pliable material are clamped between said interengaged locking portions to hold the sheets together, each of said ears curving arcuately towards each other at an angle of less than 90 degrees so that when in a closed position, the closure is substantially formed into an A-shape with the ears comprising the base of the A, thereby the closure to close and clamp the closure onto sheets of pliable material for clamping the sheets of pliable material together.

2. The closure of claim 1, including a bag secured along one side of its open end to one of said ears.

3. The closure of claim 1, wherein said ears curve arcuately towards each other in the released position of said closure and are at angles less then 90° to said leg portions.

4. The closure of claim 3, wherein the radius of curvature of one ear is less than that of the other, said one ear being adapted to engage above said other ear in said locking position.

5. The closure of claim 4, wherein said one ear is positioned closer to said live hinge line than said other ear.

6. The closure of claim 1, wherein said leg portions are of reduced thickness at their outer edges and adjacent said live hinge line and of increased thickness adjacent said upstanding ears.

7. The closure of claim 6, wherein said leg thickness adjacent said ears is at least 1 ½ times said reduced leg thickness.

8. The closure of claim 7, wherein said leg portions are of tapering thickness between said ears and said live hinge line.

9. The closure of claim 6, wherein said ears are of thickness approximately equal to that of said increased thickness areas of said leg portions.

10. The closure of claim 1, wherein one of said leg portions is slightly longer than the other of said leg portions.

11. The closure of claim 1, wherein one ear is positioned about ⅔ of the way between said live hinge line and the outer edge of its leg portion, the other ear is positioned about ¾ of the way between said live hinge line and the outer edge of its leg portion.

12. The closure of claim 1, wherein said member forms an angle of about 45° in said A-shaped locking position.

13. The closure of claim 1, wherein said material comprises a copolymer of more than 85 percent polypropylene and the rest polyethylene.

14. The closure of claim 13, wherein the copolymer is 1 to 2 percent polyethylene and 99 to 98 percent polypropylene.

15. The closure of claim 13, wherein said material is mixed with an anti-static material.

16. The closure of claim 15, wherein said mixture contains up to 5 percent by weight of said anti-static material.

17. The closure of claim 15, wherein said anti-static material is a glyceride emulsifier.

18. The closure of claim 15, wherein the mixture contains an ultra-violet inhibitor.

19. The closure of claim 1, wherein said material comprises at least 95 percent polypropylene and the rest rubber.

20. The closure of claim 1, wherein said material comprises at least 95 percent copolymer, and the rest rubber.

21. The closure of claim 1, wherein said locking positions are adapted to engage a non-porous material to provide an air-tight seal.

* * * * *